(12) United States Patent
Liu et al.

(10) Patent No.: US 11,500,652 B2
(45) Date of Patent: Nov. 15, 2022

(54) METHOD AND SYSTEM FOR APPLICATION LOADING

(71) Applicant: International Business Machines Corporation, Armonk, NY (US)

(72) Inventors: Xin Peng Liu, Beijing (CN); Zhou Xing, Beijing (CN); Jia Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 611 days.

(21) Appl. No.: 14/644,371

(22) Filed: Mar. 11, 2015

(65) Prior Publication Data

US 2015/0312314 A1    Oct. 29, 2015

(30) Foreign Application Priority Data

Apr. 23, 2014 (CN) .......................... 201410166757.8

(51) Int. Cl.
*G06F 9/445*   (2018.01)

(52) U.S. Cl.
CPC ................ *G06F 9/44521* (2013.01)

(58) Field of Classification Search
CPC ...... G06F 9/44521; G06F 17/30; G06F 17/20; G06F 16/00; G06F 16/30
USPC ......................................................... 707/615
See application file for complete search history.

(56) References Cited

U.S. PATENT DOCUMENTS

| 8,250,457 B2 * | 8/2012 | Fainberg | ............. H04L 67/5681 |
| | | | 715/205 |
| 2012/0311554 A1 * | 12/2012 | Dai | ......................... G06F 9/445 |
| | | | 717/167 |

FOREIGN PATENT DOCUMENTS

| CN | 102043621 A | * | 10/2004 | ............. H04L 67/56 |
| CN | 101296255 A | * | 6/2008 | ............. H04L 29/08 |
| CN | 101296255 A | | 10/2008 | |
| CN | 102043621 A | * | 1/2010 | ............. G06F 17/30 |
| CN | 201010569389 | * | 12/2010 | ............. G06F 17/30 |
| CN | 201010569389 A | | 12/2010 | |
| CN | 102043621 A | | 5/2011 | |
| CN | 10129625 | * | 1/2012 | ............... G06F 9/44 |
| CN | 101296255 B | | 9/2012 | |

(Continued)

OTHER PUBLICATIONS

The Dojo Toolkit, "dojo.require," Reference Guide Documentation, p. 1-2, Dojo Foundation, Dojo Version 1.7, http://dojotoolkit.org/reference-guide/1.7/dojo/require.html, Accessed on Mar. 25, 2015.

(Continued)

*Primary Examiner* — Hosain T Alam
*Assistant Examiner* — Tracy M McGhee
(74) *Attorney, Agent, or Firm* — Anthony Curro (57) ABSTRACT

The present invention discloses a method and system for application loading, the method comprising: receiving from the client a method tag request triggered on the basis of the tagging method of the application; retrieving the method tag in a method tag index store; obtaining, in response to the method tag being retrieved, a method content body corresponding to the method tag; and sending the method content body to the client. The present invention reduces the number of redundant codes to be loaded, thereby accelerating the application loading time.

19 Claims, 8 Drawing Sheets

(56) References Cited

FOREIGN PATENT DOCUMENTS

CN    105094857 B    11/2015
CN    105094857 B     9/2018

OTHER PUBLICATIONS

Disclosed Anonymously, "Self-Learned Preloading Approach in Ajax Application", IP.com No. IPCOM000223262D, IP.com Electronic Publication: Nov. 15, 2012, 12 pages.
Liu et al, "Method and System for Application Loading", Chinese Patent Application No. 201410166757.8, filed Apr. 23, 2014, 25 pages.
China National Intellectual Property Administration, Office Action and Search Report, dated Oct. 13, 2017, 2 pages, CN Application No. 201410166757.8.
China National Intellectual Property Administration, Office Action, dated Feb. 27, 2018, 4 pages, CN Application No. 2014101667578.
China National Intellectual Property Administration, Office Action, dated Oct. 25, 2017, 8 pages, CN Application No. 2014101667578.
China National Intellectual Property Administration, Search Report, dated Oct. 13, 2017, 4 pages, CN Application No. 2014101667578.

\* cited by examiner

METHOD AND SYSTEM FOR APPLICATION LOADING

BACKGROUND

The present invention relates to an information processing method and system, and more specifically, to a method and system for application loading.

In order to improve user experience and attract users, more and more scripts, JavaScript for example, are rendered and used at the front end of many large web applications; the time and cost for loading these scripts at server end also increase with the increase of scripts. Currently many methods for improving the loading performance are limited at the file/module level. Although the performance can be improved further, the loading time of some large applications at client is still quite long, which causes great inconvenience to users. Therefore, there is a need for a method and system capable of further accelerating application loading.

SUMMARY

According to one aspect of the present invention, there is provided a method for application loading, comprising: sending a tagging method of the application to a client; receiving from the client a method tag request triggered on the basis of the tagging method, wherein a method tag is included in the method tag request; retrieving the method tag in a method tag index store; obtaining, in response to the method tag being retrieved, a method content body corresponding to the method tag; and sending the method content body to the client.

According to another embodiment of the present invention, there is provided a system for application loading, comprising: a sending module configured to send a tagging method of the application to a client; a receiving module configured to receive from the client a method tag request triggered on the basis of the tagging method, wherein a method tag is included in the method tag request; a retrieving module configured to retrieve the method tag in a method tag index store; a method content body obtaining module configured to obtain, in response to the method tag being retrieved, a method content body corresponding to the method tag; and a method content body sending module configured to send the method content body to the client.

Related detailed embodiments of the present invention reduce the number of redundant codes to be loaded, thereby accelerating the application loading time.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

Figure 1:
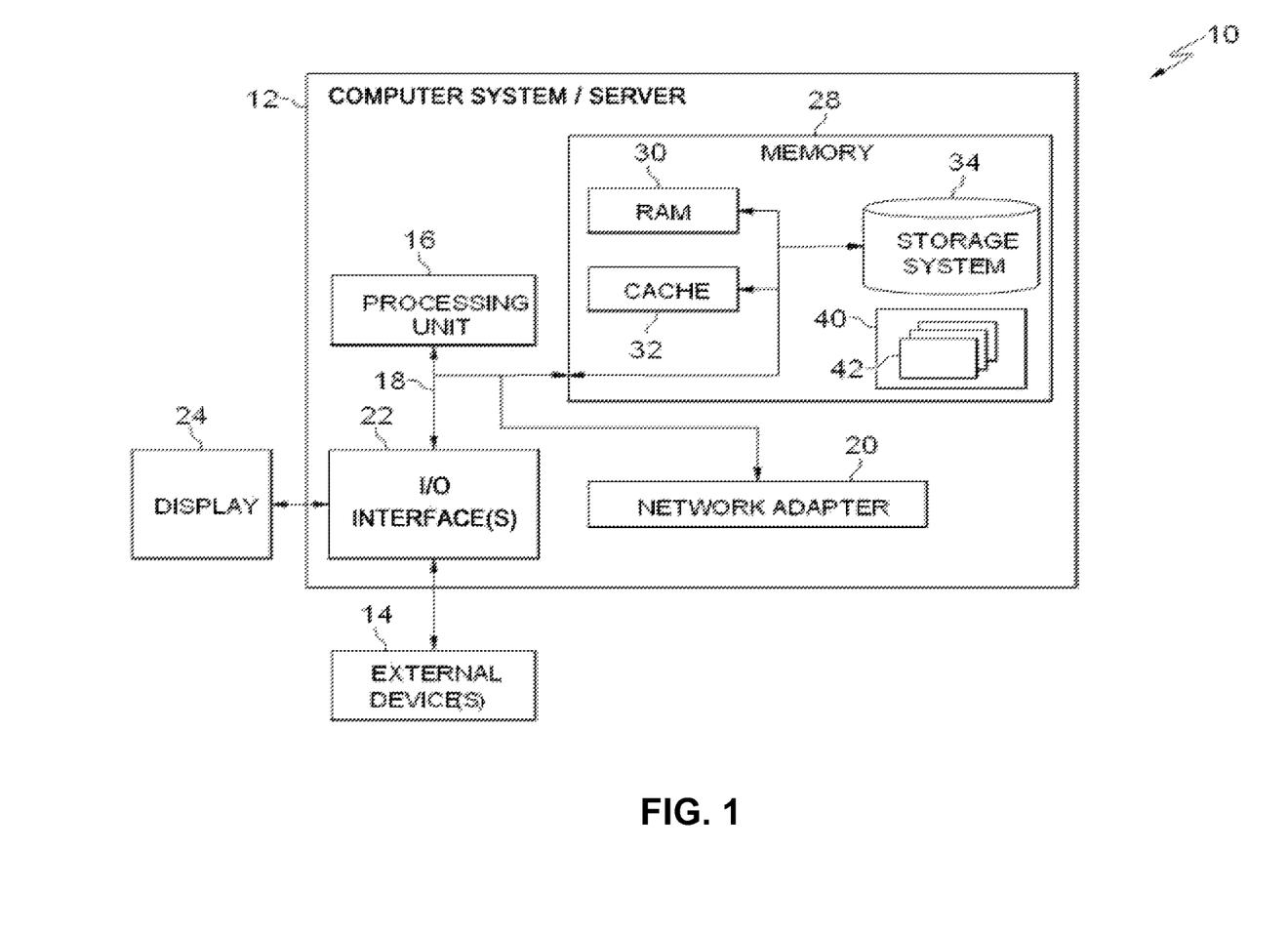
FIG. 1 shows an exemplary illustration 10 of a computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

After a long-term study on application loading, applicants find that even for optimized application loading process, still a lot of scripts have to be transmitted and loaded in loading applications, because many codes for responding to user actions will be loaded to the front end interfused with a file; in fact, many user operations in a page are not definitely triggered by a user, so many codes become unreachable, useless loaded codes in a particular case, and further the precious transmission and loading time is wasted. Based on the above findings, the applicants have invented a method level based method for optimizing application loading of the present application. The present invention's following embodiments will be illustrated based on examples of JavaScript. However, it should be noted that various embodiments of the present invention may be used for optimization so long as a script language used at client is an interpreted-type, i.e., scripts transferred from server end to client for execution are source codes or partially processed source codes rather than a binary executable file which is edited at server send. Therefore, the present invention is not limited to JavaScript.

While studying the method level based method for optimizing application loading, the applicants have found that typically client application codes at least have two types of methods as below:

(1) User Interface (UI) generating method, which is used for providing a Graphical Interface (GI) to end users for interaction;

(2) user action handler method, which is used for responding to operational actions towards the user interface and thereby triggering event based logics; these logics are used for further generating any interfaces or responding to events generated by interface components and executing corresponding actions.

Take JavaScript as an example. Codes (including scripts) for the UI generating method have the following characteristics:

Scripts embedded into an HTML tag and used for generating a page, such as:

<head> <javascript>abc( )</javascript> </head>

(a) onLoad event on HTML Body tag, which is executed when the page is being loaded, such as:

<BODY onLoad="window.alert("Welcome to the Brave New World home page!")>

(b) postCreat method in Widget, which is used for generating its UI view when Widget is being created, such as:

```
dojo.declare("custom.helloWorldWidget", [ dijit._Widget,
        dijit._Templated ],
{
        ...
        postCreate: function( ) {
        ...
        }
}
```

Scripts for the user action handler method have the following characteristics: these scripts are typically represented as method declarations and executions having the following method names inside script tags: onclick, ondblclick, onmousedown, onmousemove, onmouseout, onmouseove, onmouseup, onkeydown, Onkeypress, Onkeyup, onchange, onsubmit, onreset, onselect, onblur, onfocus, etc. Of course, the user action handler method further comprises other method declarations and executions in the above-listed methods calling chain. A basic idea of the present invention lies in normally loading UI generating methods in application codes according to a method in the prior art without special handling, while applying the special handling to user action handler methods in script codes. As a result, only user action handler methods that have been handled specially are loaded at the initial application loading stage, thereby greatly reducing the user waiting time; in the meanwhile, since the UI generation is not affected, little impact is exerted on the user experience.

Figure 2:
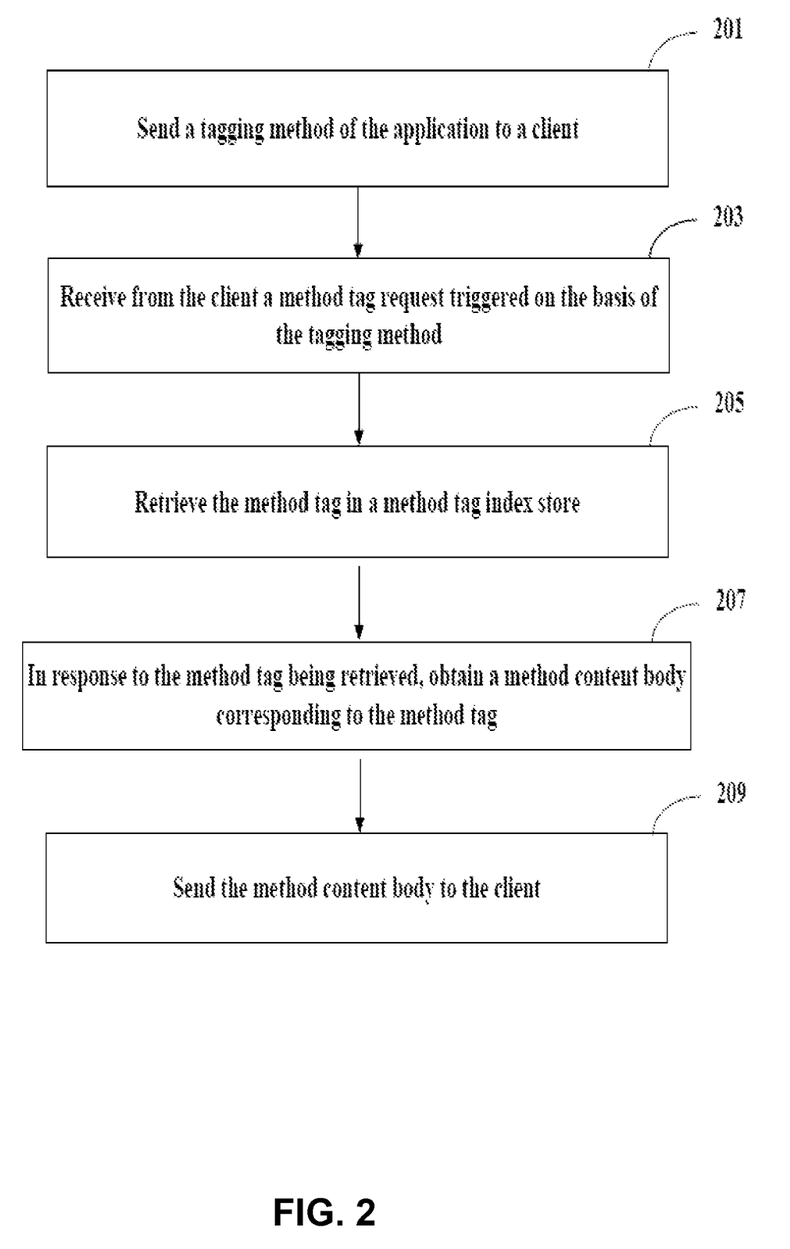
FIG. 2 shows a first specific embodiment of a method for application loading of the present invention.

FIG. 2 shows a first specific embodiment of a method for application loading of the present invention. In step 201, a tagging method of the application is sent to client. Specifically, a method content body in a user action handler method in codes of the application is replaced by a method tag (or referred to as a tag for short), whereby the application's tagging method is formed. Since the tagging method does not have a real method content body, the loading time of the application containing the tagging method at client will become very short, and the loading will become very fast. A preferred approach of how to form a tagging method will be illustrated in a second specific embodiment of a method for application loading of the present invention. In step 203, a method tag request triggered based on the tagging method is received from the client, wherein the method tag request includes a method tag. When the user has an interest in a function of the application, he/she might utilize a keyboard, mouse, touch screen or other existing input modes to use the function via a UI; however, since the function corresponds to a tagging method which does not have a concrete method content body, the client, based on the tagging method, may trigger a method tag request which includes a corresponding method tag, thereby requesting a server for a corresponding method content body. In step 205, retrieving the method tag is performed in a method tag index store. Based on the received method tag request, a corresponding method tag is obtained from the request; according to the method tag, retrieving the method tag is performed in a method tag index store stored on the server. A preferred generating approach of a method tag index store will be illustrated in a subsequent specific embodiment of the present invention. In step 207, in response to the method tag being retrieved, a method content body corresponding to the method tag is obtained. In the method tag index store, one of entries is as shown in Table 1, which includes a method tag and a corresponding method content body. When a method tag contained in a method tag request and its corresponding entry are retrieved in the method tag index store, a method content body corresponding to the method tag may be obtained from the entry.

TABLE 1

| Method Tag | Method Content Body |
|---|---|
| tag_id1 | var helloStr = getHelloStr( ); alert(helloStr); |

In step 209, the method content body is sent to the client. The method content body is sent from the server to the client; after the client obtains the method content body, it then may interpret and execute the method content body. For example, for a web application program, the method content body may be interpreted and executed by a browser, so that the user is enabled to use functions of the method.

Figure 3:
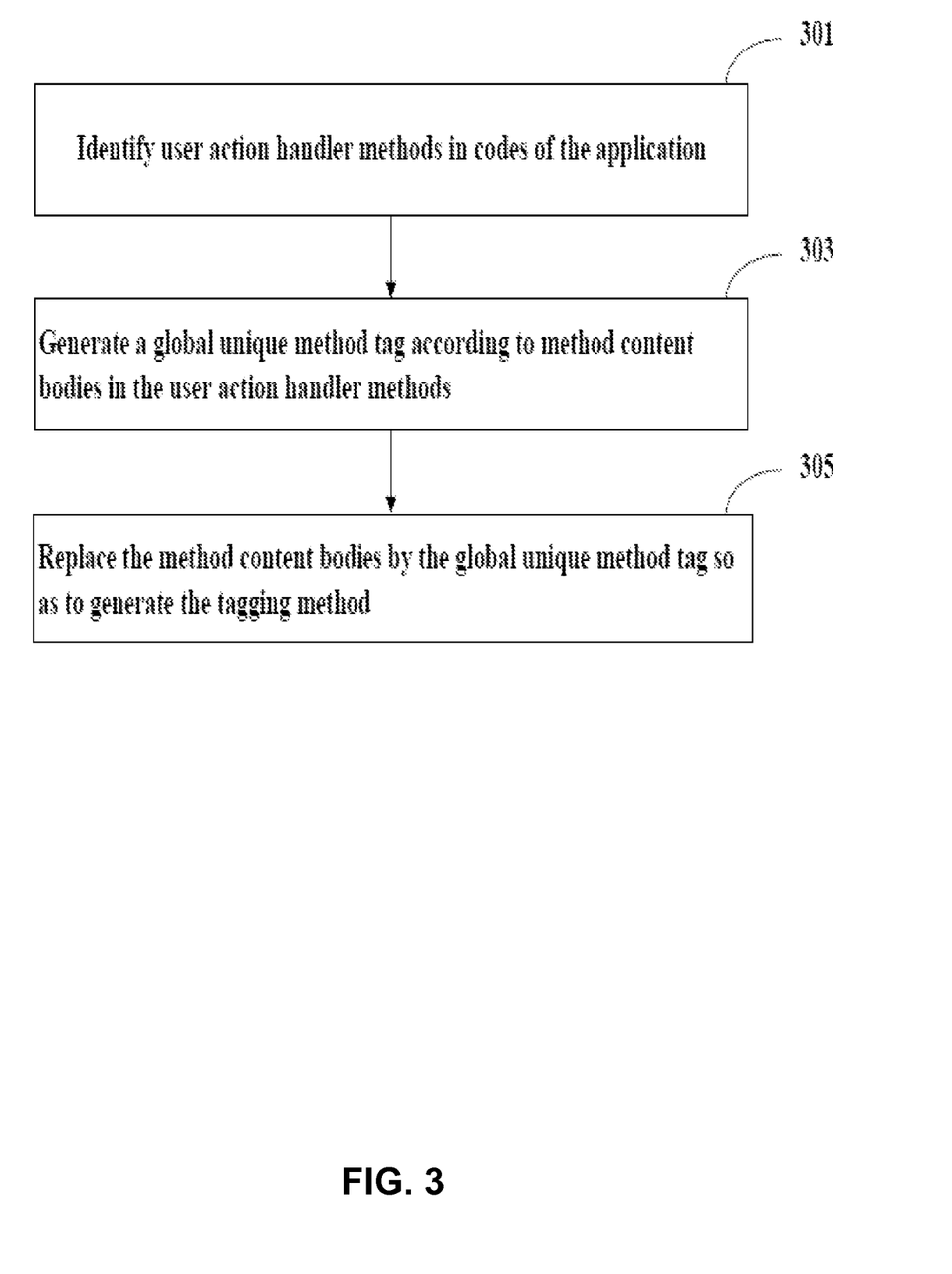
FIG. 3 shows a second specific embodiment of a method for application loading of the present invention.

FIG. 3 shows a second specific embodiment of a method for application loading of the present invention. In the second specific embodiment, an introduction is presented to a preferred approach on how to form a tagging method. In step 301, user action handler methods in codes of the application are identified. According to the definition of user action handler methods, codes of the application may be scanned with existing tools such as Eclipse JDT (Java™ Development Tools), Narcissus, JSHint, Parasoft etc., whereby the application's user action handler method is identified. Preferably, codes of the application are analyzed to obtain the user action handler method and further obtain calling information between the user action handler methods. Preferably, for obtaining the calling relationship, one user action handler method may act as an entry, and a calling chain of this user action handler method is obtained sequentially, thereby obtaining calling information between the user action handler methods. Besides using these existing tools to scan codes and obtain a calling relationship, those skilled in the art may also compile related widgets based on the present application to achieve the above functions. In step 303, a global unique method tag is generated according to a method content body in the user action handler methods. It should be ensured as a priority that the method tag is globally unique. Method tags of the user action handler methods may be generated based on the method content body. Since the method content body has different contents, a method tag corresponding to the method is generated using an existing digital digest algorithm like SHA1 and Base64 and by taking method bodies as contents, and the method tag obtained as such is globally unique. An advantage of using this method of generating a method tag is that only one global unique method tag will be generated even when a plurality of same user action handler methods are used in the application; as a result, the computation load and information redundancy are reduced greatly; in addition, even when the same user action handler methods exist among a plurality of different applications, only one global unique method tag may be saved. In step 305, the method content body is replaced with the global unique method tag so as to generate the tagging method. After obtaining the global unique method tag, method body contents of the user action handler methods of the application may be replaced with the global unique method tag, whereby the tagging method is generated. That is, the method that a method content body of methods of the application is replaced with a tag is referred to as a tagging method. Since the tagging method does not have a complex method content body any more, it becomes a lightweight method; when the method is loaded, the time needed is also quite short, which can greatly improve the user experience. Further, the method tag index store of the application is generated according to the global unique method tag and its corresponding method content body. A structure of the method tag index store is as shown in Table 1 above. Preferably, if calling information between user action handler methods is further obtained in step 301, then the method tag index store is enabled to contain calling information between the user action handler methods. Regarding a data structure, one column is added to Table 1 for recording a calling relationship between user action handler methods. One example of a new structure of the method tag index store is as shown in Table 2, wherein the calling relationship column characterizes that a method content body corresponding to Tag1 calls a method content body corresponding to Tag2. An advantage of adding the calling relationship is that when loading concrete contents of a given tag, all other method content bodies on the calling chain may be retrieved at one time, so as to reduce the number of HTTP requests and greatly increase the requesting efficiency.

TABLE 2

| Method Tag | Method Content Body | Calling Relationship |
|---|---|---|
| Tag1 | var helloStr = getHelloStr( ); alert(helloStr); | Tag2 |
| Tag2 | return "say hello"; | |

The preferred second specific embodiment will be illustrated further by means of "Hello", one simple Web application instance. First of all, developers have finished developed work of a web page as below, and the user clicks on a "sayHello" button in the page to trigger operations.

```
<html>
  <head>
    <script src="scripts/a.js" />
  </head>
  <body onload="renderPage( )">
    <button onclick="javascript:btnClick( )" > sayHello </button>
  </body>
</html>
```

The Web page references a.js, a javascript file, with contents as below:

```
//a.js
function renderPage( ){
  document.getElementById("hello").innerHTML ="Hello Disclosure";
}
function btnClick( ){
  var helloStr = getHelloStr( );
  alert(helloStr);
```

-continued

```
}
function getHelloStr( ){
   return "say hello";
}
```

By scanning the above codes, corresponding user action handler methods and a calling relationship therebetween can be identified; a global unique method tag replacement is generated based on a method content body of the user action handler method; concrete contents are then placed in a particular method tag index store, while interface generating methods do not change at all. The a.js will be re-built into a form below:

```
//a.js
//builder build
//interface generating method
function renderPage( ){
   document.getElementById("hello").innerHTML ="Hello Disclosure";
}
//user action handler method
function btnClick( ){
   $mtag("tag1");
}
//method referenced by user action handler method
function getHelloStr( ){
   $mtag("tag2");
}
```

The generated method tag index store is as shown in Table 2. A keyword $mtag represents a method content body of a current tagging method is not a real content but replaced by a tag, and a real code body needs to be obtained using a tag, and then these returned real codes are executed. Those skilled in the art may understand that any appropriate identifier may be used to represent this keyword, and $mtag is merely for illustration. For function implementations of $mtag identification and handler may include without limitation the following modes:

1. Directly modify the script interpreting engine to make it support $mtag directly
2. Add a module to the browser to make it support $mtag
3. Act as a plugin of browser to support $mtag Wherein $mtag may also be implemented as a standard method capable of supporting scripts and then put in a browser plugin in a store form to provide functions. The above several concrete implementation modes may be completely understood by those skilled in the art based on the present application and thus are not detailed here.

Figure 4:
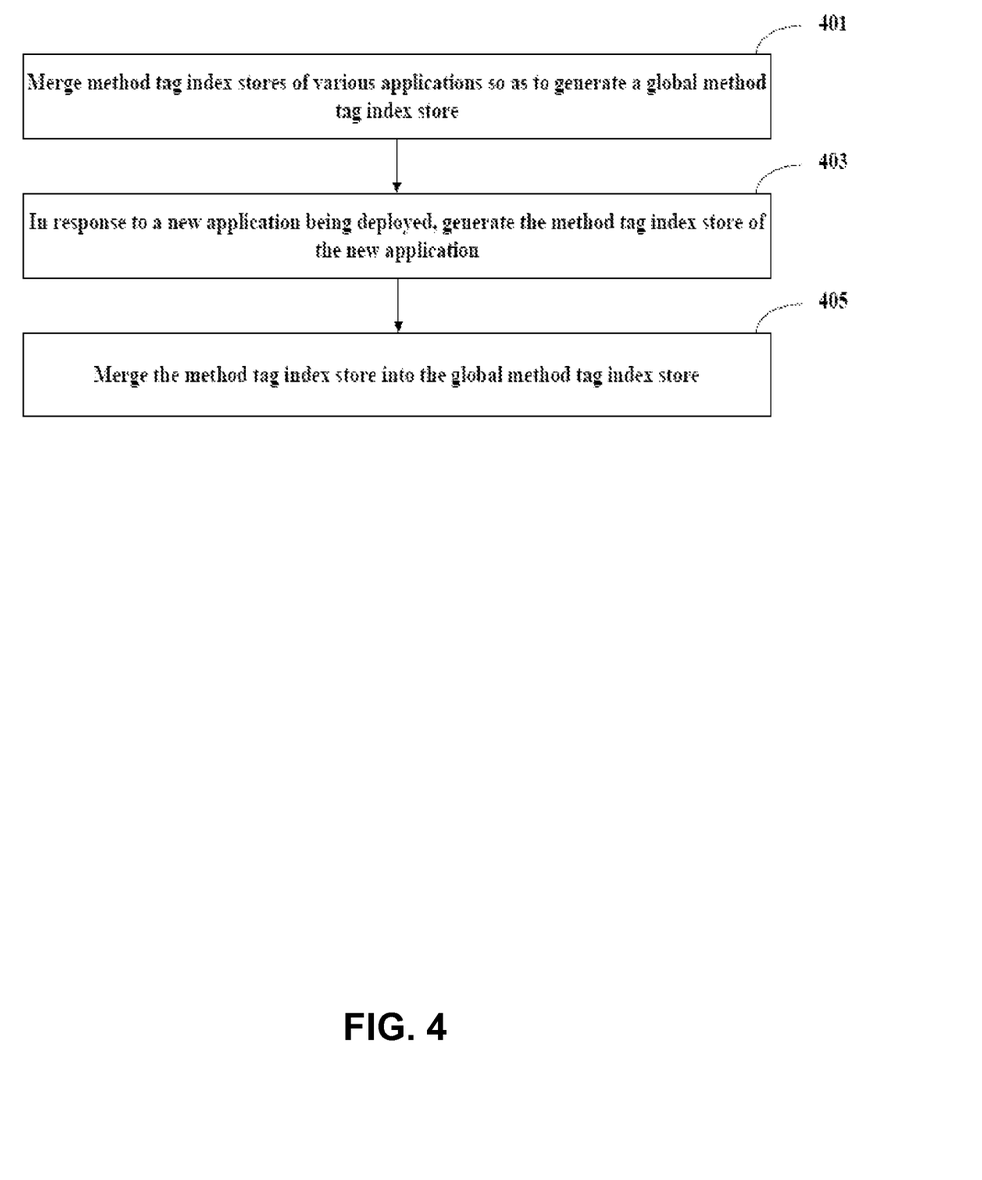
FIG. 4 shows a third specific embodiment of a method for application loading of the present invention.

FIG. 4 shows a third specific embodiment of a method for application loading of the present invention. The third specific embodiment focuses on optimizing a method tag index store of respective applications. The method tag index store generated according to the above specific embodiment is based on respective applications. However, those skilled in the art understand that actually there are many applications on the server. Moreover, applications on the server will increase constantly. If each application has its own method tag index store, then an unnecessary additional burden is caused. Therefore, there is a need to optimize method tag index stores of various applications. In step 401, method tag index stores of various applications are merged into a global method tag index store, wherein the merger comprises deleting redundant entries having the same global unique method tag. In the same server domain, method tags of various applications are generated using the same algorithm, so corresponding same method content bodies have the same global unique method tag. A copy of such method tag entries will be saved in respective method tag index stores. When forming a global method tag index store, those redundant same method tag entries may be deleted while only one entry remained. Where a method tag index store containing a calling relationship is used, a called method using the same method content body also includes deleting redundant entries having the same global unique method tag. The formed global method tag index store may be placed in a shared storage area of the server, so that related applications can access the global method tag index store while method tag index stores they have saved previously may be removed. Preferably, it may be considered deploying a new application on the server. In step 403, in response to a new application being deployed, a method tag index store of the new application is generated. The generating a method tag index store of the new application may be implemented according to the above-described method for generating method tag index stores of various applications. Preferably, while generating the method tag index store of the new application, it may be considered making reference to entries in an existing global method tag index store; every time an analyzed calling chain references generated method tags, an index relationship may be built directly, rather than generating an entry of a new method tag index store. In step 405, the method tag index store is merged into the global method tag index store. The merger may be implemented according to method of step 401. Using the solution of global method tag index store, the implementation work is simplified and the same tag contents are merged, thereby reducing storage records to increase efficiency and also simplifying the deployment difficulty.

Figure 5:
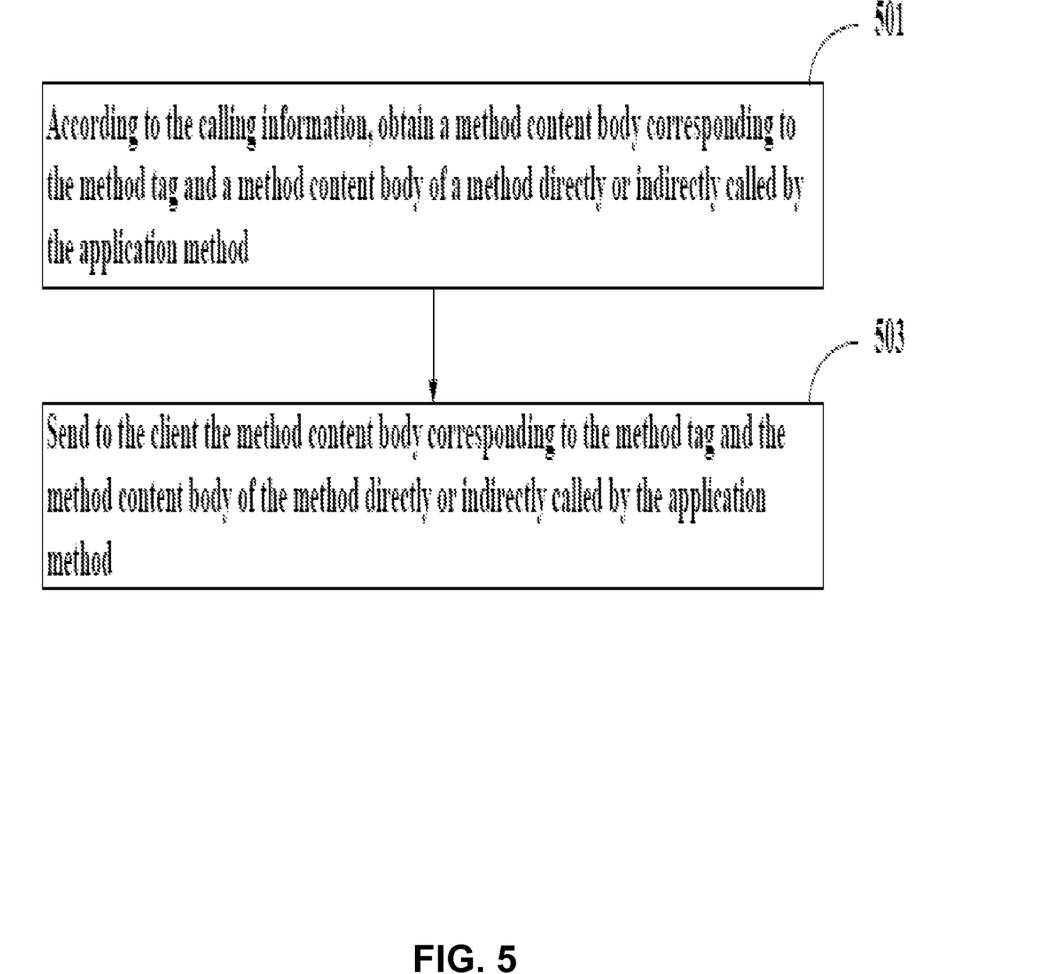
FIG. 5 shows a fourth specific embodiment of a method for application loading of the present invention.

FIG. 5 shows a fourth specific embodiment of a method for application loading of the present invention. In step 501, a method content body corresponding to the method tag and a method content body of a method directly or indirectly called by the application method are obtained according to the calling information. Where the global method tag index store contains a calling relationship between user action handler methods, if a request for a method content body is received, then the method content body and other method content body called in the method content body are obtained together. An advantage is that the method content body and other related content body can be obtained at one time, rather than the client making requests one after another, so multiple occurrences of client—server end communication are avoided. In step 503, a method content body corresponding to the method tag and a method content body of a method directly or indirectly called by the application method are sent to the client. Take HTTP as an example, when sending a method content body to the client, a GET method may be used. Specifically, contents to be transferred at least contain a tag replaced by a method body, which may serve as HTTP header of HTTP GET reply; and contents to be transferred further include the replaced method content body. The method content body may be transmitted in clear text, i.e., transmitting the replaced method content body and a method content body on the calling chain as HTTP Body in certain format; also, contents to be transferred may be packaged into a file and sent with GET reply in an attachment form, at which point a GZIP or TAR attachment form of MIME may be used. No matter which form is used, it belongs to HTTP standard forms, and no modification is needed from client. Of course, those skilled in the art may conceive of any other equivalent approach to send a related method content body to client, based on the present application.

Figure 6:
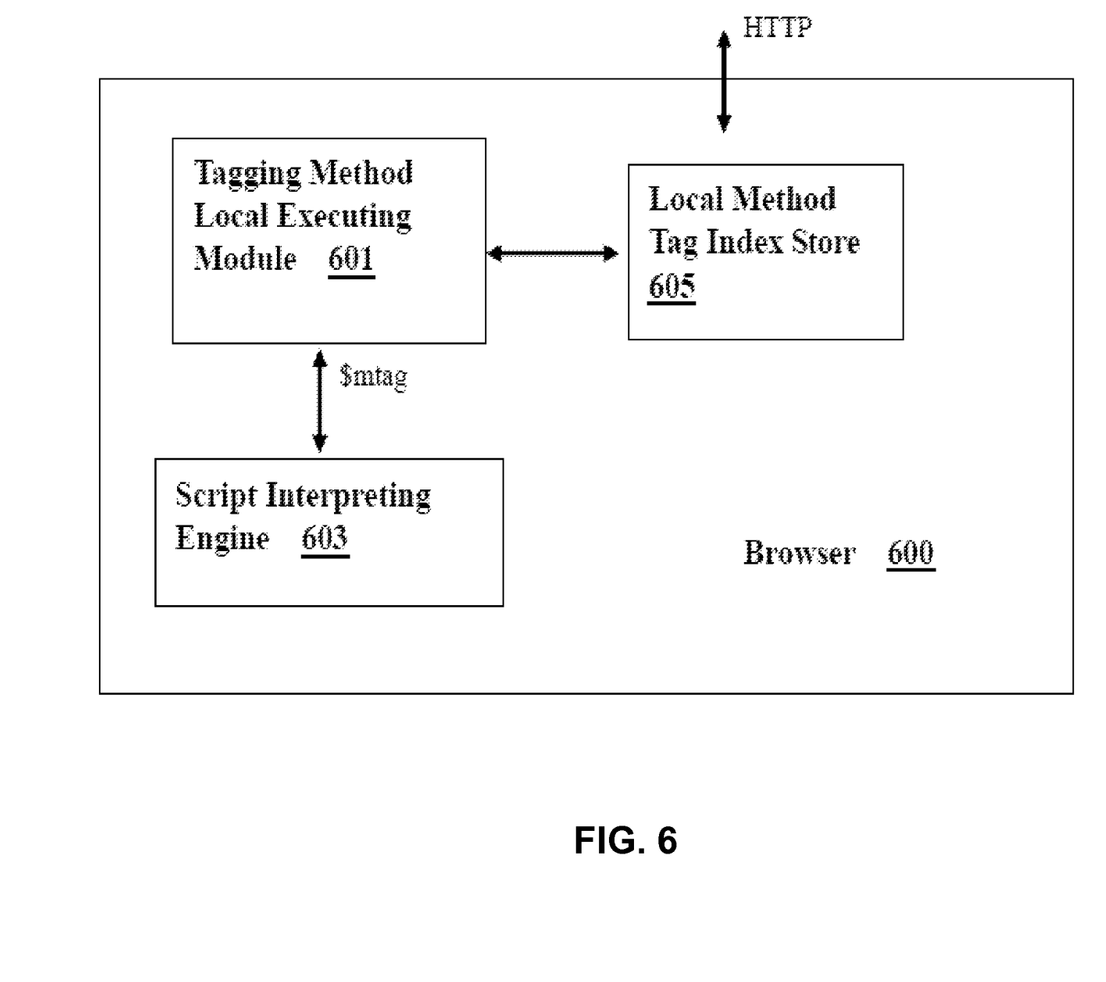
FIG. 6 shows a structural diagram of client of the present invention.

FIG. 6 shows a system architecture diagram of client for running a web application of the present application. Also, how the present invention is running at client is illustrated with the above web application instance, "Hello": the web page processed as such and the built javascript file a.js are deployed on the web server, and corresponding user action handler method tags are merged into a global method tag index store on the web server for query where necessary. The "Hello" page is loaded by browser 600, and the tagged a.js will be loaded to the browser. Since this page already contains complete codes of a method renderPage for rending pages, the UI generating method will be executed normally. When a user clicks on a sayHello button in the page, since codes of a user action handler method bound to the button are replaced with a tag, an http request of a method tag will be sent. In response to this request, a method tag index store located at the server will query a method body corresponding to the method tag in the store, find that this method further references other method, and thus send codes corresponding to Tag1 and Tag2 back to the client. Based on the method codes sent back, the client continues to execute codes in the current context so as to complete processing application logics.

Figure 7:
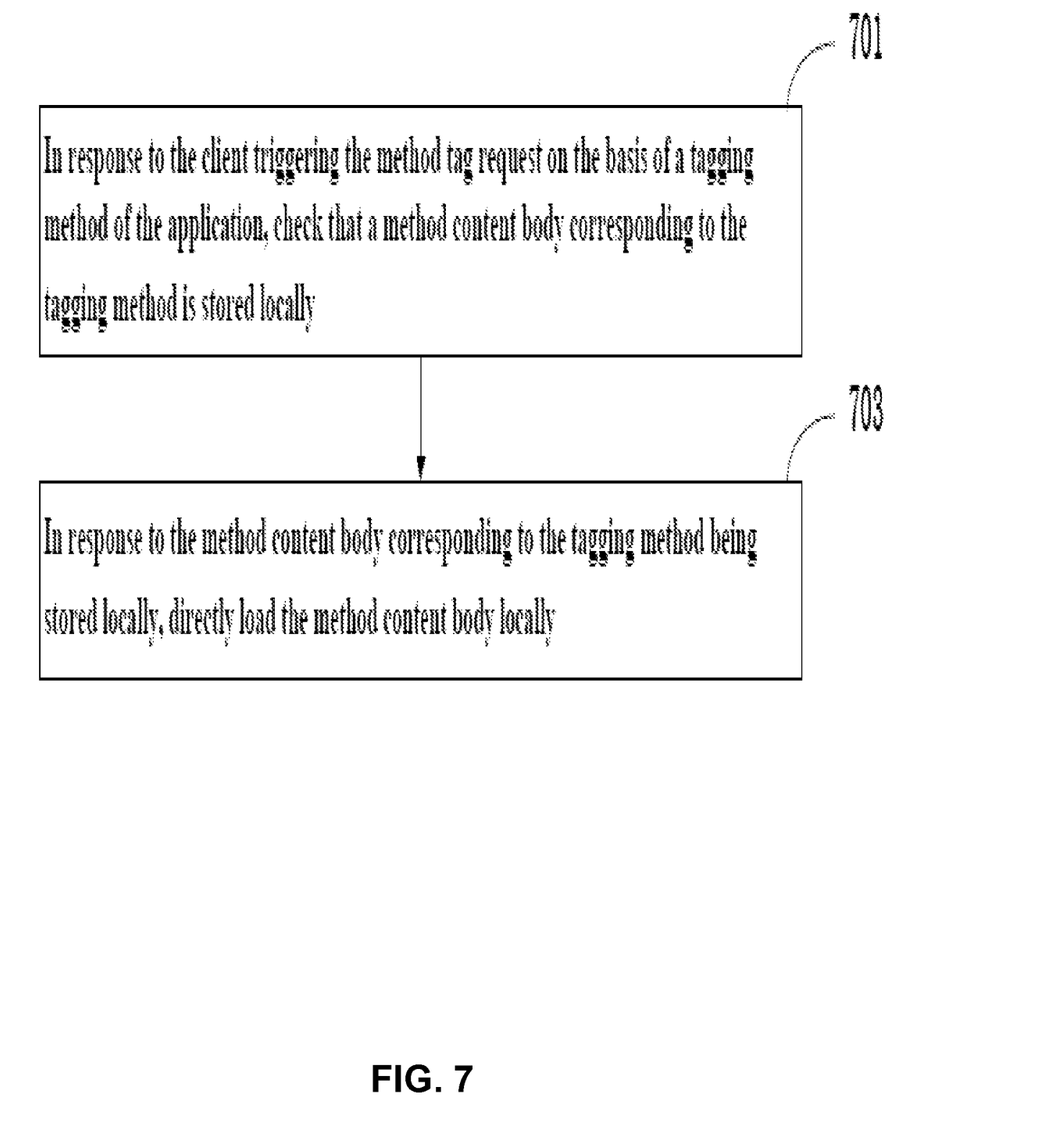
FIG. 7 shows a fifth specific embodiment of a method for application loading of the present invention.

Preferably, FIG. 7 shows a fifth specific embodiment of a method for application loading of the present invention. In step 701, in response to the client triggering the method tag request based on the application's tagging method, it is checked whether a method content body corresponding to the tagging method is stored locally. A local method tag index store 605 is built in browser 600 using a buffer, for saving previously retrieved method content bodies corresponding to respective method tags, whose concrete structure may be shown in Table 1 or Table 2 above. When the user triggers an action by a mouse, keyboard or other means, a script interpreting engine 603 interprets and executes a user action handler program. When confronted with the tag $mtag, a tagging method local handler module 601 requests the method tag and first checks the local method tag index store 605. In step 703, in response to a method content body corresponding to the tagging method being stored locally, the method content body is loaded directly and locally. If the requested method tag exists in a local buffer, then the corresponding code body is directly returned to script interpreting engine 603 for continuous execution; otherwise, an http remote request is sent to the global method tag index store deployed on the server. Based on storage records, the global method tag index store returns the method content body and its referenced method body to tagging method local handler module 601, which in turn delivers the method content body and its referenced method body to script interpreting engine 603 for continuous execution. By means of the fifth specific embodiment, the time for later obtaining a method content body may be reduced significantly, and further the user experience is improved.

Figure 8:
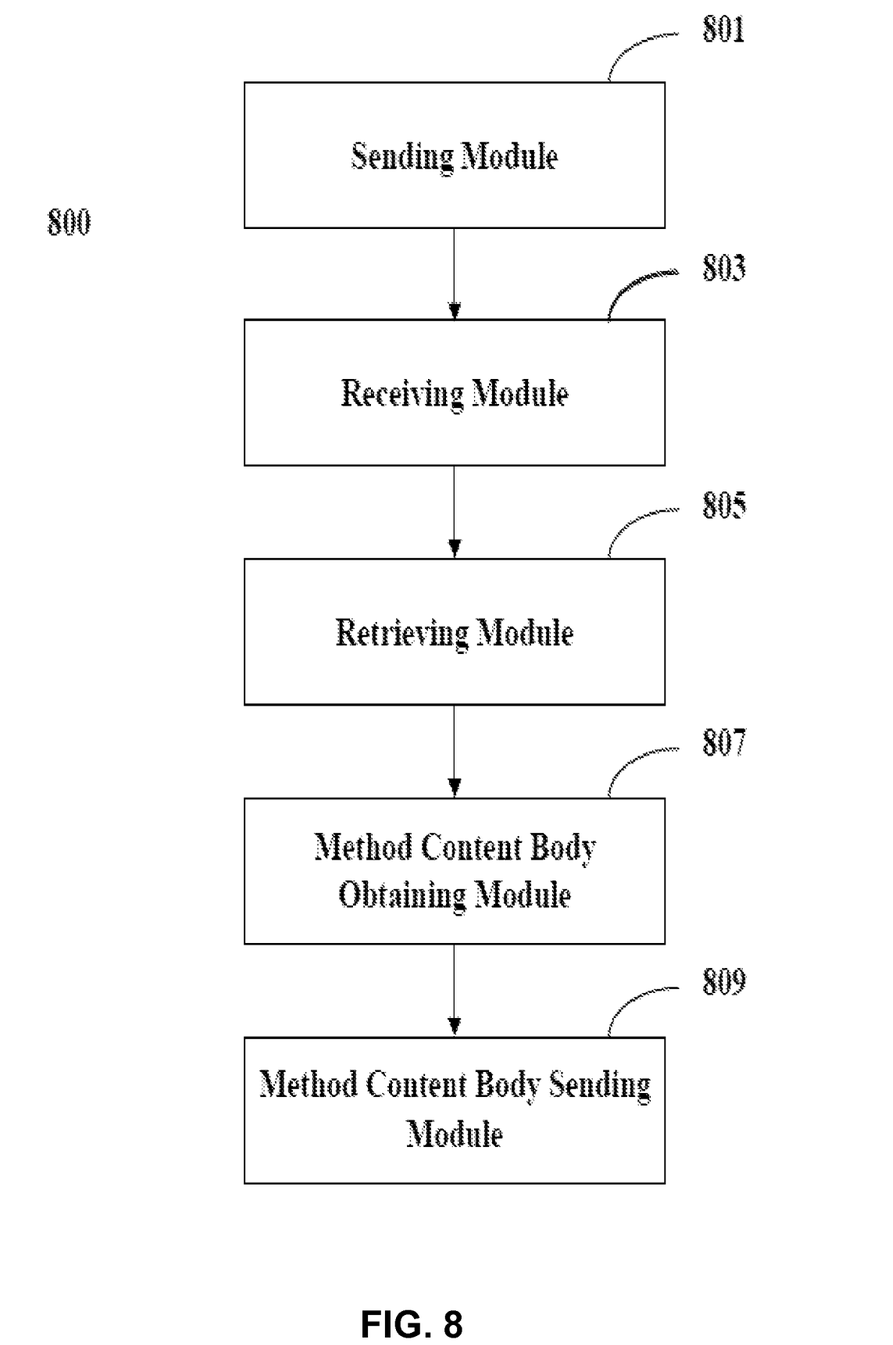
FIG. 8 shows a frame diagram of a system for application loading of the present invention.

The present invention further provides a system 800 for application loading. System 800 comprises: a sending module 801 configured to send a tagging method of the application to a client; a receiving module 803 configured to receive from the client a method tag request triggered on the basis of the tagging method, wherein a method tag is included in the method tag request; a retrieving module 805 configured to retrieve the method tag in a method tag index store; a method content body obtaining module 807 configured to obtain, in response to the method tag being retrieved, a method content body corresponding to the method tag; and a method content body sending module 809 configured to send the method content body to the client. The implementation of these modules has been illustrated in detail in the foregoing various embodiments and thus is not detailed here.

Preferably, system 800 further comprises: an identifying module configured to user action handler methods in codes of the application; a tag generating module configured to generate a global unique method tag according to method content bodies in the user action handler methods; and a tagging method generating module configured to replace the method content bodies by the global unique method tag so as to generate the tagging method.

Preferably, system 800 further comprises: an index store generating module configured to generate the method tag index store of the application according to the global unique method tag and its corresponding method content bodies.

Preferably, the identifying module comprises: an analyzing module configured to analyze codes of the application so as to obtain the user action handler methods; a calling information obtaining module configured to obtain calling information between the user action handler methods, wherein the index store generating module further comprises: a module for generating the method tag index store of the application according to the global unique method tag and its corresponding method content bodies as well as calling information between the user action handler methods.

Preferably, system 800 further comprises: a merging module configured to merge method tag index stores of various applications to generate a global method tag index store, wherein the merger comprises deleting redundant entries having the same global unique method tag.

Preferably, system 800 further comprises: a second index store generating module configured to, in response to a new application being deployed, generate the method tag index store of the new application; and a second merging module configured to merge the method tag index store into the global method tag index store.

Preferably, the method content body obtaining module comprises: a module for obtaining, according to the calling information, a method content body corresponding to the method tag and a method content body of a method directly or indirectly called by the application method.

Preferably, the method content body sending module comprises: a module for sending to the client a method content body corresponding to the method tag and a method content body of a method directly or indirectly called by the application method.

Preferably, system 800 further comprises: a checking module configured to, in response to the client triggering the method tag request based on a tagging method of the application, check that a method content body corresponding to the tagging method is stored locally; and a local loading module configured to, in response to the method content body corresponding to the tagging method being stored locally, directly load the method content body locally.

Preferably, the application is a web application, and codes of the application comprise JavaScript.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for loading an application, comprising:
   scanning one or more user action handler methods in one or more methods in the source code of the application comprising a plurality of method content bodies each containing source code, wherein the one or more user action handler methods are one or more codes executed when a client triggers an action via a user interface generated by a user interface generating method;

sending a tagging method of the application to the client, wherein the tagging method comprises at least one of the one or more user action handler methods with a method tag in place of a method content body, wherein after the tagging method the application comprises a plurality of method tags in place of the plurality of method content bodies;

receiving from the client a method tag request;

retrieving the method tag in a method tag index store based on matching the method tag in the method tag index with the received method tag request;

obtaining, in response to the method tag being retrieved, the method content body of source code corresponding to the method tag; and sending the method content body of source code to the client.

2. The method according to claim 1, further comprising:
in response to a new application being deployed, generating a new method tag index store for the new application; and
merging the new method tag index store into a global method tag index store.

3. The method according to claim 1, wherein the obtaining, in response to the method tag being retrieved, the method content body of source code corresponding to the method tag further comprises:
obtaining, according to the calling information, the method content body of source code corresponding to the method tag and a second method content body of source code of a second method directly or indirectly called by the application method.

4. The method according to claim 1, wherein the sending the method content body of source code to the client comprises:
sending to the client a method content body of source code corresponding to the method tag and a second method content body of source code of a second method directly or indirectly called by the application method.

5. The method according to claim 1, further comprising:
in response to the client triggering the method tag request and sending a tagging method of the application to the client and receiving from the client the method tag request, checking whether the method content body corresponding to the method tag has been stored locally; and
in response to the method content body corresponding to the method tag having been stored locally, directly loading the method content body locally.

6. The method according to claim 1, wherein the application is a web application, and codes of the application comprise JavaScript source code.

7. A system for loading an application, comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, wherein the computer system is capable of performing a method comprising:

scanning one or more user action handler methods in one or more methods in the source code of the application comprising a plurality of method content bodies each containing source code, wherein the one or more user action handler methods are one or more codes executed when a client triggers an action via a user interface generated by a user interface generating method;

sending a tagging method of the application to the client, wherein the tagging method comprises at least one of the one or more user action handler methods with a method tag in place of a method content body, wherein after the tagging method the application comprises a plurality of method tags in place of the plurality of method content bodies;

receiving from the client a method tag request;

retrieving the method tag in a method tag index store based on matching the method tag in the method tag index with the received method tag request;

obtaining, in response to the method tag being retrieved, the method content body of source code corresponding to the method tag; and sending the method content body of source code to the client.

8. The system according to claim 7, further comprising:
in response to a new application being deployed, generating a new method tag index store for the new application; and
merging the new method tag index store into a global method tag index store.

9. The system according to claim 7, wherein the obtaining, in response to the method tag being retrieved, the method content body of source code corresponding to the method tag further comprises:
obtaining, according to the calling information, the method content body of source code corresponding to the method tag and a second method content body of source code of a second method directly or indirectly called by the application method.

10. The system according to claim 7, further comprising:
in response to the client triggering the method tag request and sending a tagging method of the application to the client and receiving from the client the method tag request, checking whether the method content body corresponding to the method tag has been stored locally; and
in response to the method content body corresponding to the method tag having been stored locally, directly loading the method content body locally.

11. A computer program product for loading an application, the computer program product comprising:
one or more computer-readable non-transitory storage devices and program instructions stored on at least one of the one or more computer readable non-transitory storage devices, the program instructions executable by a processor, the program instructions comprising the steps of:

scanning one or more user action handler methods in one or more methods in the source code of the application comprising a plurality of method content bodies each containing source code, wherein the one or more user action handler methods are one or more codes executed when a client triggers an action via a user interface generated by a user interface generating method;

sending a tagging method of the application to the client, wherein the tagging method comprises at least one of one or more user action handler methods with a method tag in place of a method content body;
receiving from the client a method tag request;
retrieving the method tag in a method tag index store;
obtaining, in response to the method tag being retrieved, the method content body of source code corresponding to the method tag; and
sending the method content body of source code to the client.

12. The method according to claim 1, further comprising:
generating a global unique method tag according to method content bodies in the user action handler methods; and
replacing the method content bodies by the global unique method tag so as to generate the tagging method, wherein the global unique method tag becomes a method tag corresponding to the tagging method.

13. The method according to claim 12, further comprising:
generating the method tag index store of the application according to the global unique method tag and its corresponding method content bodies.

14. The method according to claim 12, wherein the identifying user action handler methods in codes of the application comprises:
analyzing codes of the application so as to obtain the user action handler methods;
obtaining calling information between the user action handler methods, wherein the generating the method tag index store of the application according to the global unique method tag and its corresponding method content bodies further comprises:
generating the method tag index store of the application according to the global unique method tag and its corresponding method content bodies as well as the calling information between the user action handler methods.

15. The method according to claim 12, further comprising:
merging method tag index stores of various applications to generate a global method tag index store, wherein the merger comprises deleting redundant entries having the same global unique method tag.

16. The system according to claim 7, further comprising:
generating a global unique method tag according to method content bodies in the user action handler methods; and
replacing the method content bodies by the global unique method tag so as to generate the tagging method, wherein the global unique method tag becomes a method tag corresponding to the tagging method.

17. The system according to claim 16, further comprising:
generating the method tag index store of the application according to the global unique method tag and its corresponding method content bodies.

18. The system according to claim 16, wherein the identifying user action handler methods in codes of the application comprises:
analyzing codes of the application so as to obtain the user action handler methods;
obtaining calling information between the user action handler methods, wherein the generating the method tag index store of the application according to the global unique method tag and its corresponding method content bodies further comprises:
generating the method tag index store of the application according to the global unique method tag and its corresponding method content bodies as well as the calling information between the user action handler methods.

19. The system according to claim 16, further comprising:
merging method tag index stores of various applications to generate a global method tag index store, wherein the merger comprises deleting redundant entries having the same global unique method tag.

* * * * *